(12) United States Patent
Fujii et al.

(10) Patent No.: US 10,647,276 B2
(45) Date of Patent: May 12, 2020

(54) VEHICLE BODY STRUCTURE

(71) Applicant: HONDA MOTOR CO., LTD., Tokyo (JP)

(72) Inventors: Momoka Fujii, Wako (JP); Tomohito Kamada, Wako (JP); Isamu Nakanishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 16/209,108

(22) Filed: Dec. 4, 2018

(65) Prior Publication Data

US 2019/0168702 A1 Jun. 6, 2019

(30) Foreign Application Priority Data

Dec. 6, 2017 (JP) ................................. 2017-234337

(51) Int. Cl.
*B60R 19/34* (2006.01)
*B60R 19/24* (2006.01)
*B60R 19/18* (2006.01)

(52) U.S. Cl.
CPC .............. *B60R 19/34* (2013.01); *B60R 19/18* (2013.01); *B60R 19/24* (2013.01); *B60R 2019/247* (2013.01)

(58) Field of Classification Search
CPC ....... B60R 19/02; B60R 19/023; B60R 19/18; B60R 19/24; B60R 19/26; B60R 19/34
USPC ................................................. 296/132, 133
See application file for complete search history.

(56) References Cited

U.S. PATENT DOCUMENTS

| | | | | |
|---|---|---|---|---|
| 6,918,621 | B2 * | 7/2005 | Seksaria | B60R 19/34 293/102 |
| 7,210,719 | B2 * | 5/2007 | Honda | B60R 19/18 293/102 |
| 2007/0222239 | A1 * | 9/2007 | Arns | B60R 19/24 293/132 |
| 2011/0285152 | A1 * | 11/2011 | Kwon | B60R 19/24 293/102 |

(Continued)

FOREIGN PATENT DOCUMENTS

| | | |
|---|---|---|
| JP | 2008-110679 A | 5/2008 |
| JP | 2014-113894 A | 6/2014 |
| WO | 2015080037 A1 | 6/2015 |

OTHER PUBLICATIONS

Japanese Office Action with English translation dated Jul. 2, 2019 (8 pages).

*Primary Examiner* — Jason S Daniels
(74) *Attorney, Agent, or Firm* — Rankin, Hill & Clark LLP

(57) ABSTRACT

A vehicle body structure includes a bumper beam extending in a vehicle width direction, and a pair of right and left bumper beam mounting members each disposed at an outer side in the vehicle width direction of a back face of the bumper beam and mounting the bumper beam on a front side frame. The bumper beam includes a first displacement promoting part that is provided at a mounting part for the bumper beam and the bumper beam mounting members and capable of promoting displacement of the bumper beam by a collision load. The bumper beam mounting member includes a second displacement promoting part that is provided at the mounting part and capable of promoting displacement of the bumper beam by a collision load.

6 Claims, 6 Drawing Sheets

(56) References Cited

U.S. PATENT DOCUMENTS

2014/0062106 A1* 3/2014 Han .................. B60R 19/34
                                                    293/133
2017/0137064 A1* 5/2017 Bokeloh ............ B62D 21/11
2018/0170294 A1* 6/2018 Hashimoto ........ B60R 19/34

* cited by examiner

VEHICLE BODY STRUCTURE

CROSS-REFERENCE TO RELATED APPLICATION

This application is based upon and claims priority from the Japanese Patent Application No. 2017-234337, filed on Dec. 6, 2017, the entire contents of which are incorporated herein by reference.

BACKGROUND OF THE INVENTION

1. Field of the Invention

The present invention relates to a vehicle body structure.

2. Description of the Related Art

Examples of a vehicle body structure of an automobile include a vehicle body structure that includes a pair of right and left skeleton members provided to extend in the front-rear direction, a bumper beam laid between front ends of the pair of right and left skeleton members, and spacer members connecting the bumper beam with the skeleton members at the outer side of the skeleton members in the vehicle width direction (see, e.g., Patent document 1: Japanese Unexamined Patent Application Publication No. 2014-113894).

The vehicle body structure is adapted to transmit a collision load applied to a collision side of the bumper beam at the time of offset collision to the skeleton members via the spacer members, but a tensile load applied to a non-collision side of the bumper beam at the time of offset collision has not been taken into consideration. Therefore, there is a risk that strength against the tensile load could become insufficient at the non-collision side of the bumper beam to cause separation of the bumper beam from the skeleton members.

The present invention has therefore been made in view of the above problem, and an object of the invention is to provide a vehicle body structure capable of suppressing separation of a bumper beam on its non-collision side from a bumper beam mounting member at the time of offset collision.

SUMMARY OF THE INVENTION

In order to solve the above problem, according to an aspect of the present invention, a vehicle body structure reflecting one aspect of the present invention includes a bumper beam extending in a vehicle width direction, and a pair of right and left bumper beam mounting members each disposed at an outer side in the vehicle width direction of a back face of the bumper beam and mounting the bumper beam on a vehicle body, wherein at least one of the bumper beam and the bumper beam mounting members includes a displacement promoting part that is provided at a mounting part for the bumper beam and the bumper beam mounting members and capable of promoting displacement of the bumper beam by a collision load.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

DETAILED DESCRIPTION OF THE PREFERRED EMBODIMENTS

One or more embodiments of the present invention will be hereinafter described in detail with reference to the drawings as necessary. Note that "front and rear", "up and down", and "right and left" indicated by arrows in each figure indicate a front-rear direction of a vehicle body, an up-down direction of the vehicle body, and a right-left direction (vehicle width direction) viewed from a driver's seat, respectively. A vehicle body structure 1 according to an embodiment of the present invention has a structure that is laterally symmetrical to the center of the vehicle body in the right-left direction (vehicle width direction).

Figure 1:
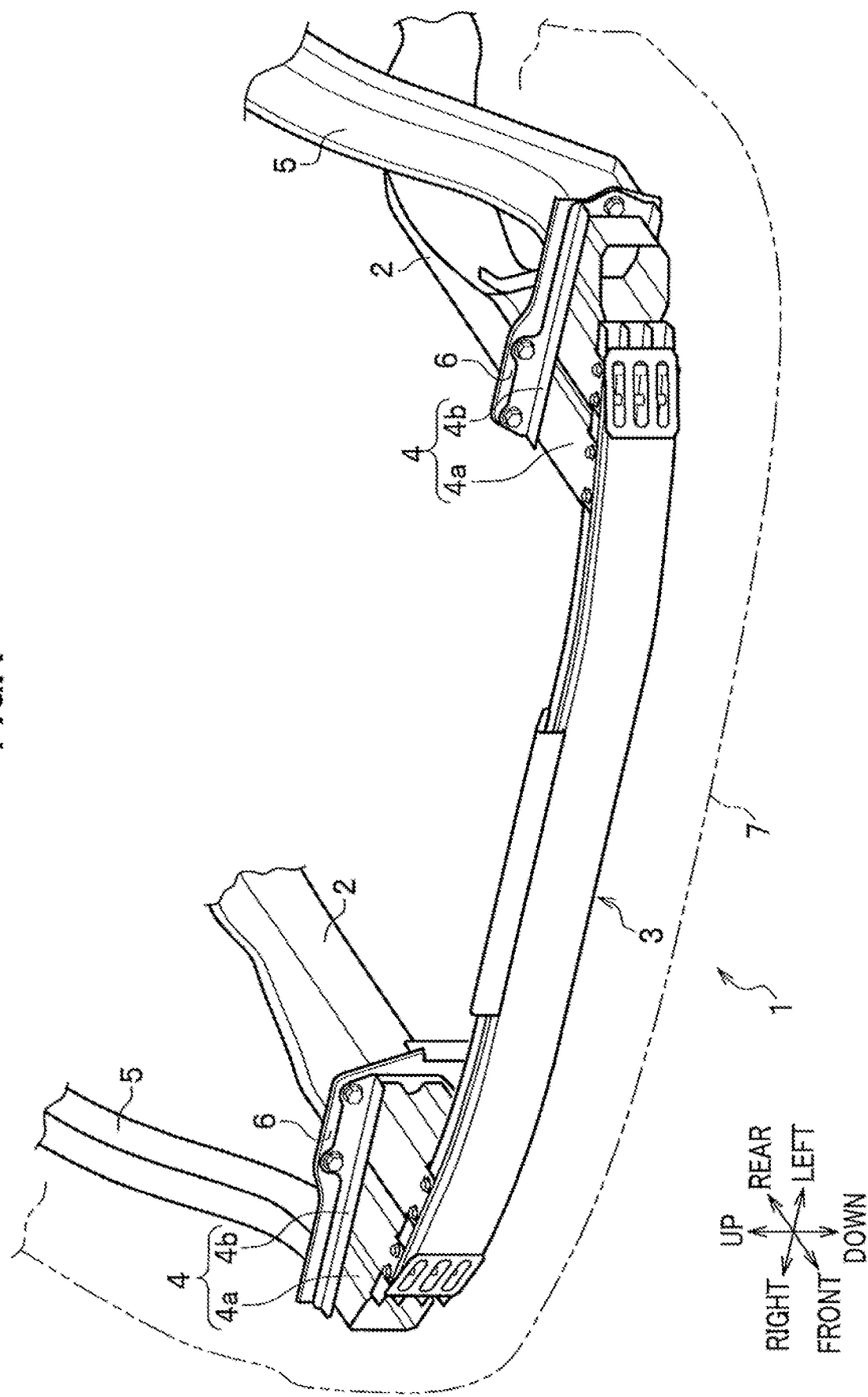
FIG. 1 is a perspective view showing a vehicle body structure according to an embodiment of the present invention.

As shown in FIG. 1, the vehicle body structure 1 of the vehicle according to the present embodiment includes a pair of right and left front side frames 2, 2; a bumper beam 3; a pair of right and left bumper beam mounting members 4, 4; and a pair of right and left lower members 5, 5.

The front side frame 2, which composes the vehicle body, is a structural member made of metal that is provided to extend in the front-rear direction. The front side frame 2 is formed into a hollow structure having a closed cross section. Moreover, a connection plate 6 is fixed to front ends of the pair of right and left front side frames 2, 2, respectively. The connection plate 6 is a plate member made of metal that connects the front side frame 2 and the bumper beam mounting member 4 with each other. The connection plate 6 is provided to extend in the up-down direction and in the vehicle width direction.

The bumper beam 3 is a member made of metal that extends in the vehicle width direction. The bumper beam 3 is laid between front ends of a pair of right and left bumper beam extensions 4a, 4a at the same height as that of each front end of the pair of right and left front side frames 2, 2. The bumper beam 3 is bent at both right and left parts thereof so as to be located on the inner side in the front-rear direction of the vehicle (on the rear side of the vehicle in the present embodiment) as it gets closer to the outer side in the vehicle width direction. The bumper beam 3 is covered by a bumper face 7 which is indicated by a virtual line in FIG. 1.

Figure 2:
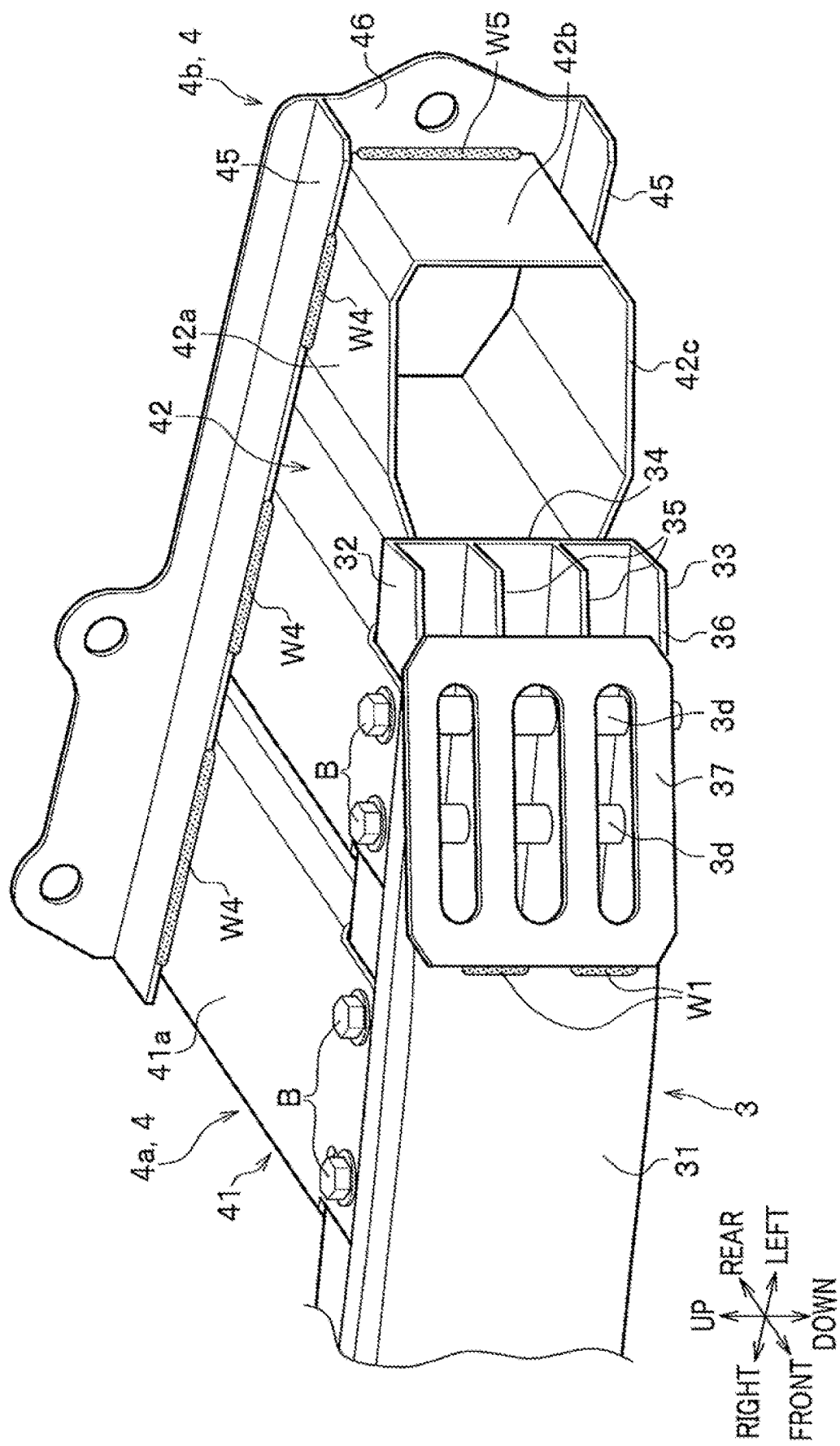
FIG. 2 is a partially enlarged perspective view of the vehicle body structure shown in FIG. 1.

The bumper beam 3 is formed of aluminum alloy extruded shape material in the present embodiment, but may be formed of other metallic materials or resin materials. As shown in FIG. 2, the bumper beam 3 is formed into a hollow structure having an eye-shaped closed cross section. The bumper beam 3 is integrally provided with a front face part 31, an upper face part 32, a lower face part 33, a back face part 34, a plurality of lateral ribs 35, and a cut part 36.

The front face part 31 is a member extending in the up-down direction and in the vehicle width direction. The front face part 31 forms an abutting face on which the bumper face 7 that is deformed hits when the vehicle collides with a collided object.

The upper face part 32 is a member extending in the front-rear direction and in the vehicle width direction. The upper face part 32 is provided to extend rearward from an upper end of the front face part 31.

The lower face part 33 is a member extending in the front-rear direction and in the vehicle width direction. The lower face part 33 is provided to extend rearward from a lower end of the front face part 31.

The back face part 34 is a member spaced rearward from the front face part 31 and extending in the up-down direction and in the vehicle width direction. The back face part 34 connects rear ends of the upper face part 32 and the lower face part 33 with each other.

The plurality of lateral ribs 35 are members each extending in the front-rear direction and in the vehicle width direction between the front face part 31 and the back face part 34. The lateral rib 35 serves to enhance a sectional rigidity of the bumper beam 3. Although the number of the lateral ribs 35 is not particularly limited, the present embodiment allows two lateral ribs 35 to be formed so as to partition the closed cross section of the bumper beam 3 into three spaces.

The cut part 36 is a member formed by obliquely cutting outer parts in the vehicle width direction of the bumper beam 3 so as to allow respective sizes in the front-rear direction of the upper face part 32, the lower face part 33 and the lateral ribs 35 to become shorter on the outer sides in the front-rear direction. More specifically, the cut part 36 is formed by cutting the whole part of the front face part 31, a part of the upper face part 32, a part of the lower face part 33, and parts of the lateral ribs 35. A cut section (opening plane) of the cut part 36 is covered by a covering material 37 from the front side of the vehicle body. The covering material 37 is a plate member made of metal and has the form similar to a shape of eyes in front view. Metal Inert Gas arc (MIG) welding W1 is performed on an inner corner that is configured by the covering material 37 and an edge part of the cut part 36.

The bumper beam mounting member 4 is disposed at the outer side in the vehicle width direction of the back face part 34 of the bumper beam 3 and is a member made of metal that mounts the bumper beam 3 on the front side frame 2 (see FIG. 1). The bumper beam mounting member 4 includes a bumper beam extension 4a and a mounting plate 4b.

The bumper beam extension 4a is disposed on the back face part 34 of the bumper beam 3 and is a member made of metal that extends in the front-rear direction. The bumper beam extension 4a protrudes outward in the vehicle width direction from the bumper beam 3. The bumper beam extension 4a is formed of aluminum alloy extruded shape material in the present embodiment, but may be formed of other metallic materials or resin materials. The bumper beam extension 4a has a nearly trapezoidal shape such that a size in the front-rear direction becomes small at the outer side in the vehicle width direction in planar view. The bumper beam extension 4a has a box-shaped hollow structure that opens in the front-rear direction, and is configured to be more fragile than the bumper beam 3 and the front side frame 2, e.g., by appropriate selection of a thickness of the bumper beam extension 4a. The bumper beam extension 4a is adapted to be crushed in the front-rear direction by a collision load at the time of collision of the vehicle, thereby absorbing impact.

Figure 3:
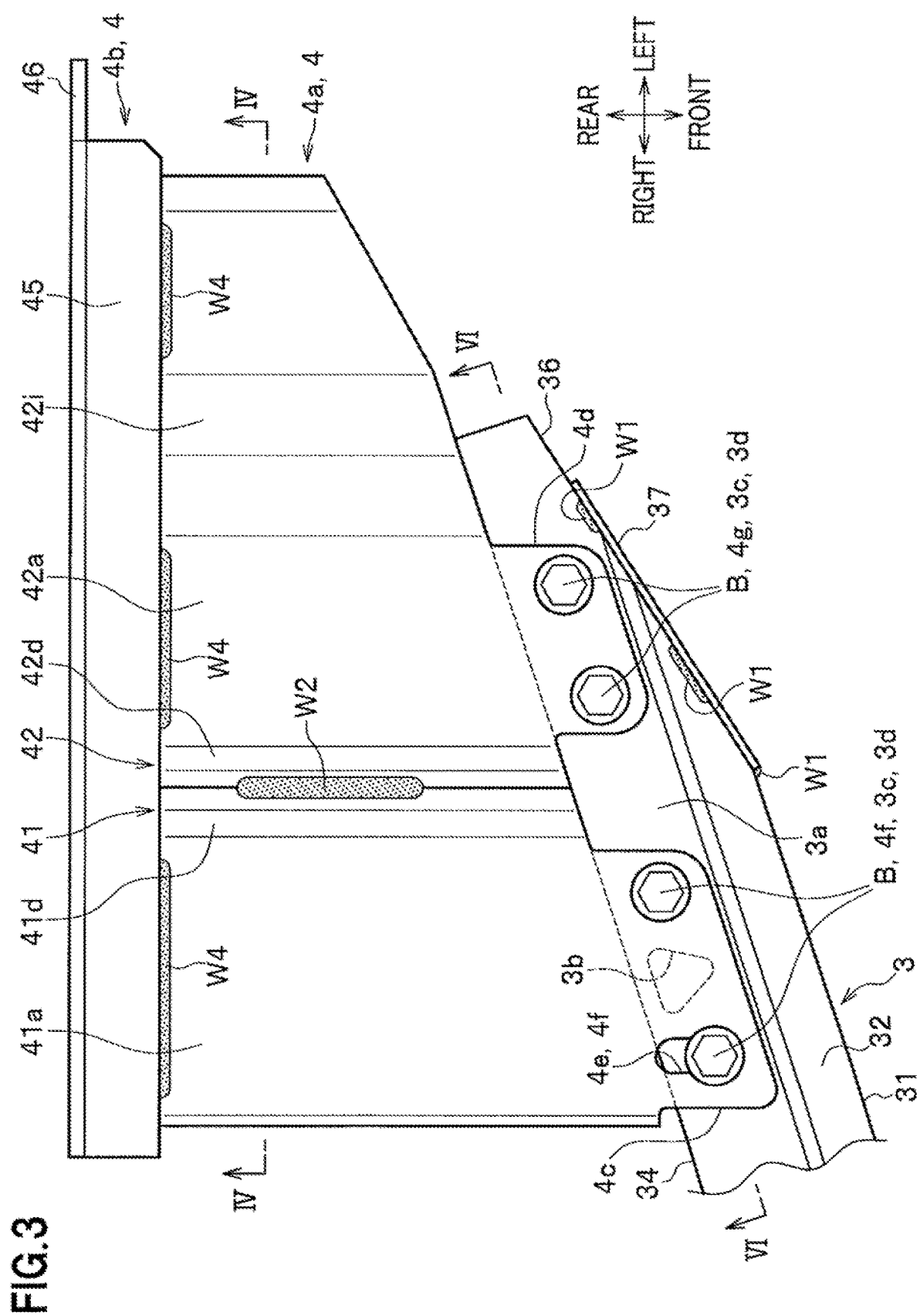
FIG. 3 is a plan view of the structure shown in FIG. 2.

As shown in FIG. 3, the bumper beam extension 4a includes a first divided body 41 and a second divided body 42. That is, the bumper beam extension 4a is divided into the first divided body 41 and the second divided body 42 in the vehicle width direction.

Figure 4:
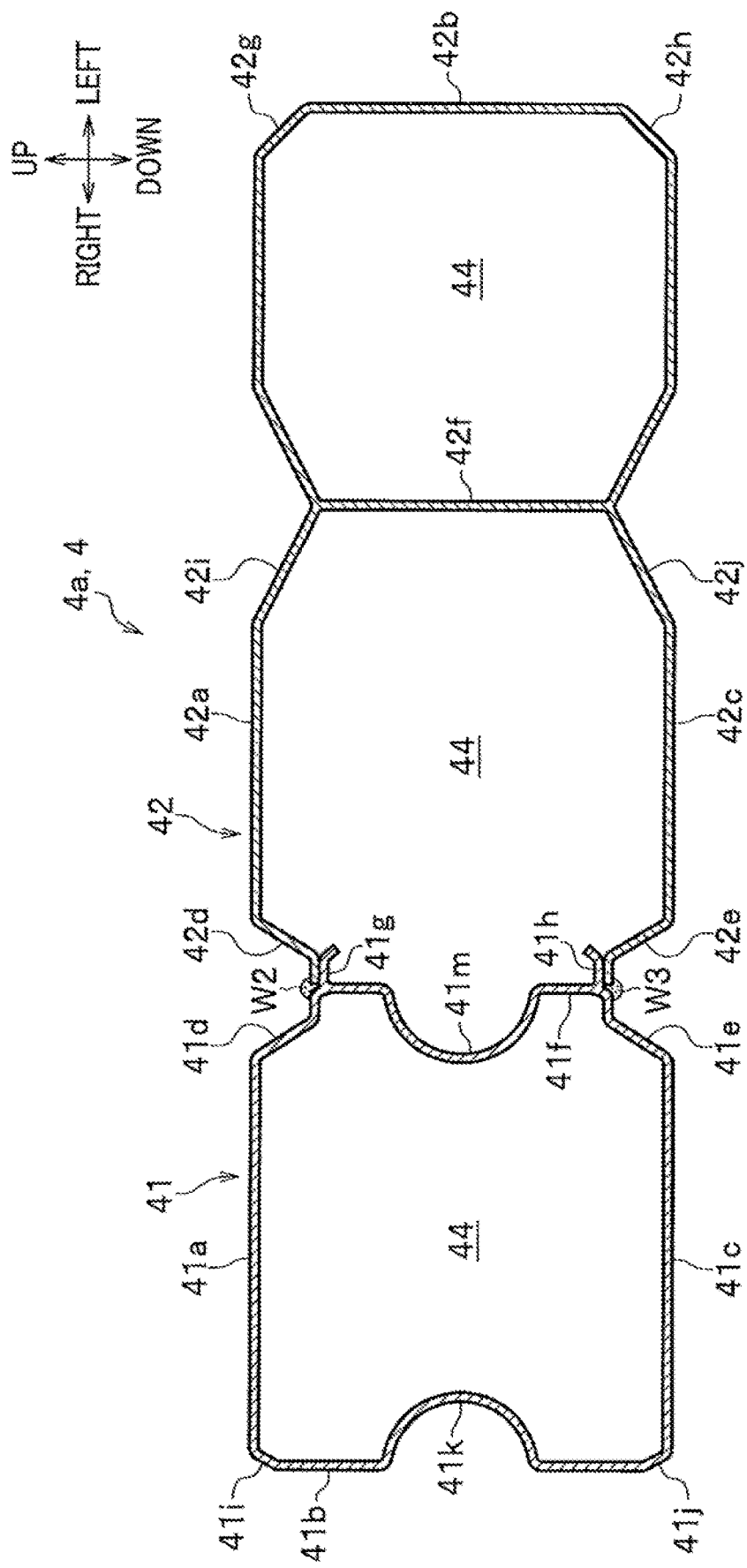
FIG. 4 is a sectional view taken along the line IV-IV in FIG. 3.

As shown in FIG. 4, the first divided body 41 is located at the inner side in the vehicle width direction and is a part that composes an upper wall part, an inner wall part and a lower wall part of the bumper beam extension 4a. The first divided body 41 occupies about one third of the overall width of the bumper beam extension 4a in front view and in planar view in the present embodiment. The first divided body 41 has the form of a nearly octagonal frame in cross sectional view. The first divided body 41 is integrally provided with a first upper wall part 41a, a first inner wall part 41b, a first lower wall part 41c, a first falling wall part 41d, a first rising wall part 41e, a first rib 41f, a first upper protruding part 41g, and a first lower protruding part 41h.

The first upper wall part 41a is apart that composes the inner side in the vehicle width direction of the upper wall part of the bumper beam extension 4a. The first upper wall part 41a extends in the vehicle width direction and in the front-rear direction.

The first inner wall part 41b is apart that composes the inner wall part of the bumper beam extension 4a. The first inner wall part 41b extends in the up-down direction and in the front-rear direction. The first inner wall part 41b is provided to extend downward from an inner end in the vehicle width direction of the first upper wall part 41a. At a corner formed by the first upper wall part 41a and the first inner wall part 41b, a first upper inclined wall 41i is formed which is inclined so as to become downward as it goes inward in the vehicle width direction. At a middle part in the up-down direction of the first inner wall part 41b, an inner bead 41k is formed which projects outward in the vehicle width direction. The inner bead 41k has the shape of an arc in cross sectional view. The inner bead 41k is provided to extend in the front-rear direction over the overall length of the first inner wall part 41b.

The first lower wall part 41c is a part that composes the inner side in the vehicle width direction of the lower wall part of the bumper beam extension 4a. The first lower wall part 41c extends in the vehicle width direction and in the front-rear direction. The first lower wall part 41c is provided to extend outward in the vehicle width direction from a lower end of the first inner wall part 41b. At a corner formed by the first inner wall part 41b and the first lower wall part 41c, a first lower inclined wall 41j is formed which is inclined so as to become downward as it goes outward in the vehicle width direction.

The first falling wall part 41d is a part that connects the first upper wall part 41a with the first rib 41f. The first falling wall part 41d extends in the up-down direction and in the front-rear direction. The first falling wall part 41d falls from an outer end in the vehicle width direction of the first upper wall part 41a. The first falling wall part 41d is inclined so as to be located on the outer side in the vehicle width direction as it goes downward, and is further bent to the outer side to extend in the vehicle width direction.

The first rising wall part 41e is a part that connects the first lower wall part 41c with the first rib 41f. The first rising wall part 41e extends in the up-down direction and in the front-rear direction. The first rising wall part 41e rises from an outer end in the vehicle width direction of the first lower wall part 41c. The first rising wall part 41e is inclined so as to be located on the outer side in the vehicle width direction as it goes upward, and is further bent to the outer side to extend in the vehicle width direction.

The first rib 41f is apart that enhances a sectional rigidity of the bumper beam extension 4a. The first rib 41f extends in the up-down direction and in the front-rear direction between respective outer ends in the vehicle width direction of the first falling wall part 41d and the first rising wall part 41e. The first rib 41f is disposed at a position of about one third from the inner side in the vehicle width direction in the overall width of the bumper beam extension 4a in front view. At a middle part in the up-down direction of the first rib 41f, an outer bead 41m is formed which projects inward in the vehicle width direction. The outer bead 41m has the shape of an arc in cross sectional view. The outer bead 41m is provided to extend in the front-rear direction over the overall length of the first rib 41f.

The first upper protruding part 41g is apart that is provided to protrude outward in the vehicle width direction from a boundary between the first falling wall part 41d and the first rib 41f. The first upper protruding part 41g protrudes more outward in the vehicle width direction than the first rib 41f. The first upper protruding part 41g is overlapped with an inner face of a second falling wall part 42d.

The first lower protruding part 41h is apart that is provided to protrude outward in the vehicle width direction from a boundary between the first rising wall part 41e and the first rib 41f. The first lower protruding part 41h protrudes more outward in the vehicle width direction than the first rib 41f. The first lower protruding part 41h is overlapped with an inner face of a second rising wall part 42e.

The second divided body 42 is located at the outer side in the vehicle width direction and is a part that composes the upper wall part, an outer wall part and the lower wall part of the bumper beam extension 4a. The second divided body 42 occupies about two thirds of the overall width of the bumper beam extension 4a in front view in the present embodiment. The second divided body 42 has a nearly U shape in cross sectional view, which opens to the inner side in the vehicle width direction. The second divided body 42 is integrally provided with a second upper wall part 42a, a second outer wall part 42b, a second lower wall part 42c, the second falling wall part 42d, the second rising wall part 42e, and a second rib 42f.

The second upper wall part 42a is a part that composes the outer side in the vehicle width direction of the upper wall part of the bumper beam extension 4a. The second upper wall part 42a extends in the vehicle width direction and in the front-rear direction. At a nearly middle part in the vehicle width direction of the second upper wall part 42a, an upper bead 42i is formed which is recessed downward. The upper bead 42i has an inverted triangular shape in cross sectional view. The upper bead 42i is provided to extend in the front-rear direction over the overall length of the second upper wall part 42a.

The second outer wall part 42b is a part that composes the outer wall part of the bumper beam extension 4a. The second outer wall part 42b extends in the up-down direction and in the front-rear direction. The second outer wall part 42b is provided to extend downward from an outer end in the vehicle width direction of the second upper wall part 42a. At a corner formed by the second outer wall part 42b and the second upper wall part 42a, a second upper inclined wall 42g is formed which is inclined so as to become downward as it goes outward in the vehicle width direction.

The second lower wall part 42c is a part that composes the outer side in the vehicle width direction of the lower wall part of the bumper beam extension 4a. The second lower wall part 42c extends in the vehicle width direction and in the front-rear direction. The second lower wall part 42c is provided to extend inward in the vehicle width direction from a lower end of the second outer wall part 42b. At a corner formed by the second outer wall part 42b and the second lower wall part 42c, a second lower inclined wall 42h is formed which is inclined so as to become downward as it goes inward in the vehicle width direction. At a nearly middle part in the vehicle width direction of the second lower wall part 42c, and at a position that coincides with the upper bead 42i in the up-down direction, a lower bead 42j is formed which is recessed upward. The lower bead 42j has a triangular shape in cross sectional view. The lower bead 42j is provided to extend in the front-rear direction over the overall length of the second lower wall part 42c.

The second falling wall part 42d is a part that connects the second upper wall part 42a with the first rib 41f. The second falling wall part 42d extends in the up-down direction and in the front-rear direction. The second falling wall part 42d falls from an inner end in the vehicle width direction of the second upper wall part 42a. The second falling wall part 42d is inclined so as to be located on the inner side in the vehicle width direction as it goes downward, and is further bent to the inner side to extend in the vehicle width direction. The second falling wall part 42d has a lower end that is overlapped with an outer face of the first upper protruding part 41g. Moreover, MIG welding W2 is performed between an outer end in the vehicle width direction of the first falling wall part 41d and an inner end in the vehicle width direction of the second falling wall part 42d. This allows upper parts of the first divided body 41 and the second divided body 42 to be fixed to each other.

The second rising wall part 42e is a part that connects the second lower wall part 42c with the first rib 41f. The second rising wall part 42e extends in the up-down direction and in the front-rear direction. The second rising wall part 42e rises from an inner end in the vehicle width direction of the second lower wall part 42c. The second rising wall part 42e is inclined so as to be located on the inner side in the vehicle width direction as it goes upward, and is further bent to the inner side to extend in the vehicle width direction. The second rising wall part 42e has an upper end that is overlapped with an outer face of the first lower protruding part 41h. Moreover, MIG welding W3 is performed between an outer end in the vehicle width direction of the first rising wall part 41e and an inner end in the vehicle width direction of the second rising wall part 42e. This allows lower parts of the first divided body 41 and the second divided body 42 to be fixed to each other.

The second rib 42f is a part that enhances a sectional rigidity of the bumper beam extension 4a. The second rib 42f extends in the up-down direction and in the front-rear direction between the second upper wall part 42a and the second lower wall part 42c. The second rib 42f connects respective apex parts of the upper bead 42i and the lower bead 42j to each other in the present embodiment. The second rib 42f is disposed at a position of about two thirds from the inner side in the vehicle width direction in the overall width of the bumper beam extension 4a in front view. Inside the bumper beam extension 4a, three closed sectional parts 44 partitioned by the first rib 41f and the second rib 42f are formed side by side in the vehicle width direction. The closed sectional parts 44 each have a nearly octagonal shape in cross sectional view.

As shown in FIG. 2, the mounting plate 4b is a plate member disposed on a back face of the bumper beam extension 4a. The mounting plate 4b extends in the up-down direction and in the vehicle width direction. The mounting plate 4b is formed of aluminum alloy extruded shape material in the present embodiment, but may be formed of other metallic materials. The mounting plate 4b includes a pair of upper and lower fitting ribs 45, 45, and a mounting flange 46.

The pair of upper and lower fitting ribs 45, 45 are parts that protrude frontward, and between which a back-side end part of the bumper beam extension 4*a* is fit. The fitting ribs 45, 45 each have the form of a rectangular plate in planar view, and extend in the front-rear direction and in the vehicle width direction. The upper fitting rib 45 is overlapped with an outer face of the upper wall part of the bumper beam extension 4*a*, and the upper fitting rib 45 and the bumper beam extension 4*a* are fixed to each other by means of MIG welding W4. The lower fitting rib 45 is overlapped with an outer face of the lower wall part of the bumper beam extension 4*a*, and the lower fitting rib 45 and the bumper beam extension 4*a* are fixed to each other by means of MIG welding (not shown).

The mounting flange 46 is a part that is located on the more outer side in the vehicle width direction than the bumper beam extension 4*a* and the bumper beam 3 between the pair of upper and lower fitting ribs 45, 45. The mounting flange 46 extends in the up-down direction and in the vehicle width direction. Moreover, MIG welding W5 is performed on an inner corner that is configured by the mounting flange 46 and the second outer wall part 42*b* of the bumper beam extension 4*a*.

As shown in FIG. 1, the pair of right and left lower members 5, 5 each is a structural member made of metal that is provided to extend in the front-rear direction on the more outer side in the vehicle width direction than the pair of right and left front side frames 2, 2, respectively. Each of the lower members 5, 5 is formed into a hollow structure having a closed cross section. The lower member 5 has a front end fixed to a back face of the mounting plate 4*b* via the connection plate 6, by means of bolts, welding or the like. The lower member 5 is formed with bend so as to be located on the upper side as it goes rearward.

Next, description will be given of a displacement promoting structure and amounting structure of the bumper beam 3 and the bumper beam mounting member 4.

Figure 5:
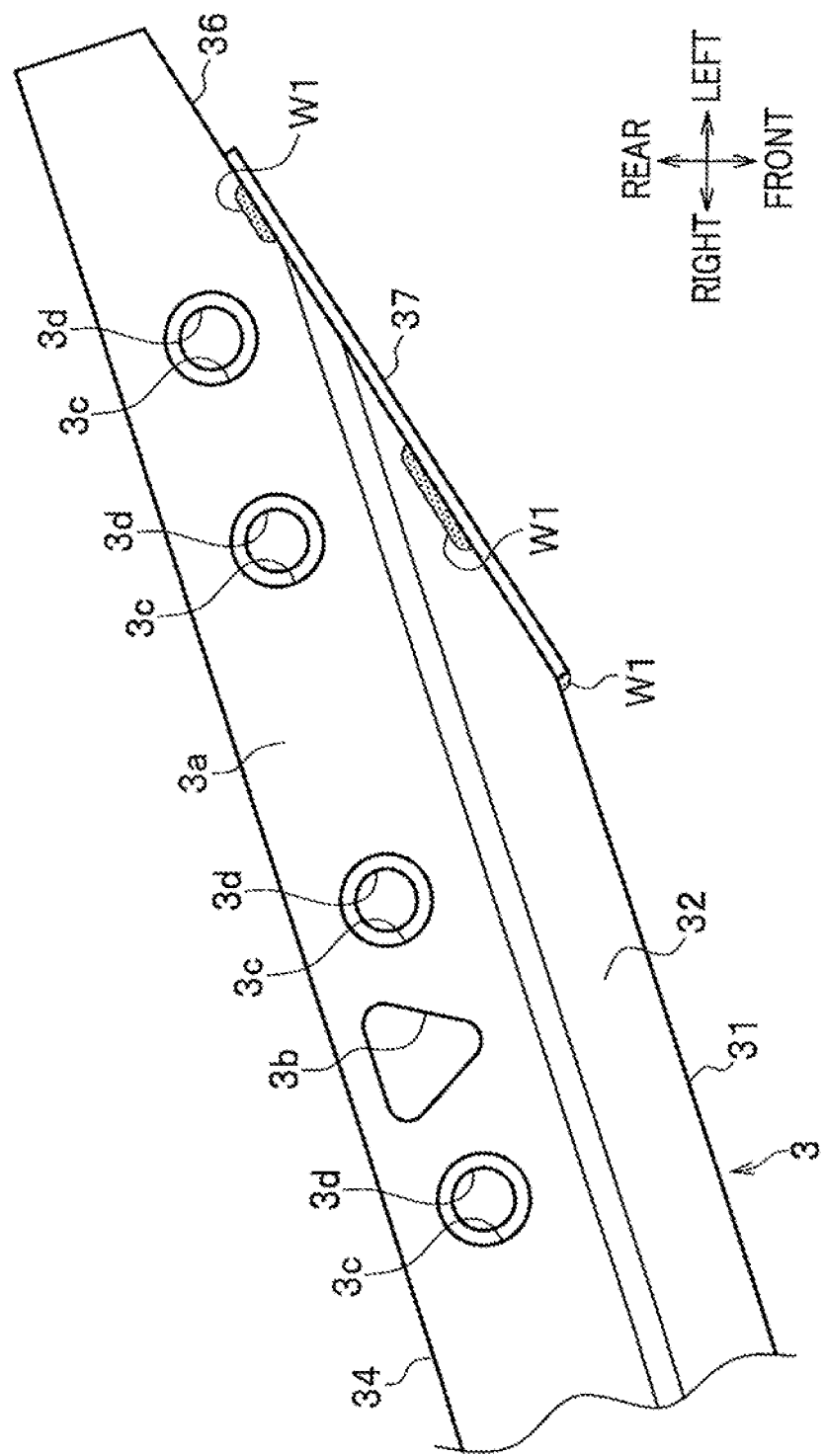
FIG. 5 is a plan view showing a bumper beam.

As shown in FIG. 3 and FIG. 5, the bumper beam 3 includes a bead-side mounting part 3*a* and a first displacement promoting part 3*b* at the outer side in the vehicle width direction.

Figure 6:
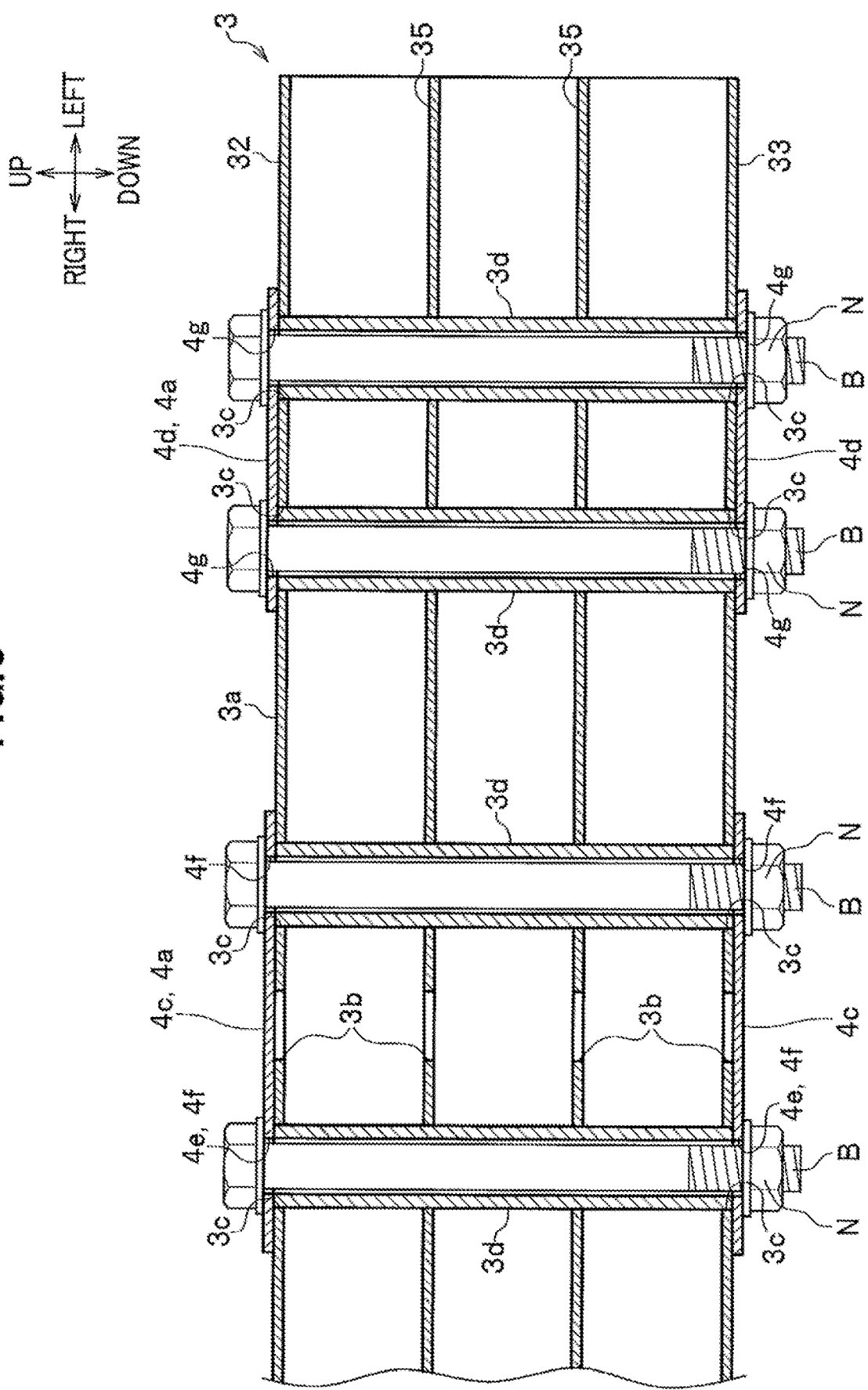
FIG. 6 is a sectional view taken along the line VI-VI in FIG. 3.

The bead-side mounting part 3*a* is a part for mounting the bumper beam mounting member 4 at the outer side in the vehicle width direction of the bumper beam 3. The bead-side mounting part 3*a* is provided with a plurality of bolt holes 3*c*. The number of the bolt holes 3*c* is not particularly limited, but four bolt holes 3*c* are provided in the present embodiment. The four bolt holes 3*c* are mutually provided at a given interval in the vehicle width direction. The bolt hole 3*c* has a circular shape in planar view. As shown in FIG. 6, the bolt hole 3*c* is a through-hole vertically penetrating the bumper beam 3, and composes amounting hole through which a bolt B being a mounting member is inserted. More specifically, the bolt hole 3*c* is composed of a plurality of through-holes that are provided at positions which vertically coincide with each other in the upper face part 32, the lower face part 33 and the lateral ribs 35. The bolt hole 3*c* has a cylindrical collar 3*d* disposed inside and extending in the up-down direction. The collar 3*d* is disposed from the through-hole in the upper face part 32 to the through-hole in the lower face part 33.

The first displacement promoting part 3*b* is a part capable of promoting displacement (deformation) of the bumper beam 3 by a collision load. The first displacement promoting part 3*b* has the form of a through-hole vertically penetrating the bumper beam 3 in the present embodiment, but may be a thinly formed part or a cut-out part. The first displacement promoting part 3*b* is composed of a plurality of through-holes that are provided at positions which vertically coincide with each other in the upper face part 32, the lower face part 33 and the lateral ribs 35. The shape of the first displacement promoting part 3*b* is not particularly limited, but the first displacement promoting part 3*b* has a triangular shape in planar view in the present embodiment as shown in FIG. 5. The first displacement promoting part 3*b* has an opening width that expands toward the inner side in the front-rear direction of the vehicle in planar view (toward the rear side of the vehicle in the present embodiment). The number and location of the first displacement promoting part 3*b* are not particularly limited, but one first displacement promoting part 3*b* is provided between adjacent bolt holes 3*c*, 3*c* in the present embodiment. More specifically, the first displacement promoting part 3*b* is provided between the first and second bolt holes 3*c*, 3*c* from the inner side in the vehicle width direction.

As shown in FIG. 3 and FIG. 6, the bumper beam mounting member 4 includes a pair of upper and lower first extending parts 4*c*, 4*c*; a pair of upper and lower second extending parts 4*d*, 4*d*; and a second displacement promoting part 4*e*.

The first extending parts 4*c*, 4*c* are flange-shaped parts that protrude frontward from the front ends of the first upper wall part 41*a* and the first lower wall part 41*c* in the first divided body 41. The first extending part 4*c* cooperates with the bead-side mounting part 3*a* to compose the mounting part for the bumper beam 3 and the bumper beam mounting member 4. The first extending parts 4*c*, 4*c* each have the form of a rectangular plate in planar view, and extend in the front-rear direction and in the vehicle width direction. The upper first extending part 4*c* is provided to extend to the upper side of the bumper beam 3 and is overlapped with an outer face of the upper face part 32 of the bumper beam 3. The lower first extending part 4*c* is provided to extend to the lower side of the bumper beam 3 and is overlapped with an outer face of the lower face part 33 of the bumper beam 3.

The first extending part 4*c* is provided with a plurality of first bolt holes 4*f*. The first bolt hole 4*f* is a through-hole vertically penetrating the first extending part 4*c*, and composes a mounting hole through which the bolt B being a mounting member is inserted. The first bolt hole 4*f* has a circular shape or a long hole shape in planar view. The number of the first bolt holes 4*f* is not particularly limited, but two pairs of upper and lower (four in total) first bolt holes 4*f* are provided for the upper and lower first extending parts 4*c*, 4*c* in the present embodiment. Two first bolt holes 4*f* on the upper side are mutually provided at a given interval in the vehicle width direction. Two first bolt holes 4*f* on the lower side are also mutually provided at a given interval in the vehicle width direction. The pair of upper and lower first bolt holes 4*f* are provided at positions that coincide with one bolt hole 3*c* (collar 3*d*) in the up-down direction. To a lower peripheral edge of the first bolt hole 4*f* on the lower side, a nut N is joined by means of welding.

The second extending parts 4*d*, 4*d* are flange-shaped parts that protrude frontward from the front ends of the second upper wall part 42*a* and the second lower wall part 42*c* in the second divided body 42. The second extending part 4*d* cooperates with the bead-side mounting part 3*a* to compose the mounting part for the bumper beam 3 and the bumper beam mounting member 4. The second extending parts 4*d*, 4*d* each have the form of a rectangular plate in planar view, and extend in the front-rear direction and in the vehicle width direction. The upper second extending part 4*d* is provided to extend to the upper side of the bumper beam 3 and is overlapped with the outer face of the upper face part 32 of the bumper beam 3. The lower second extending part 4d is provided to extend to the lower side of the bumper beam 3 and is overlapped with the outer face of the lower face part 33 of the bumper beam 3. The first extending part 4c and the second extending part 4d are spaced from each other in the vehicle width direction.

The second extending part 4d is provided with a plurality of second bolt holes 4g. The second bolt hole 4g is a through-hole vertically penetrating the second extending part 4d, and composes a mounting hole through which the bolt B being a mounting member is inserted. The second bolt hole 4g has a circular shape in planar view. The number of the second bolt holes 4g is not particularly limited, but two pairs of upper and lower (four in total) second bolt holes 4g are provided for the upper and lower second extending parts 4d, 4d in the present embodiment. Two second bolt holes 4g and the first bolt holes 4f on the upper side are mutually provided at a given interval in the vehicle width direction. Two second bolt holes 4g and the first bolt holes 4f on the lower side are also mutually provided at a given interval in the vehicle width direction. The pair of upper and lower second bolt holes 4g are provided at positions that coincide with one bolt hole 3c (collar 3d) in the up-down direction. To a lower peripheral edge of the second bolt hole 4g on the lower side, the nut N is joined by means of welding.

The bolt B is inserted from above through one bolt hole 3c (collar 3d) and the pair of upper and lower first bolt holes 4f, 4f. The bolt B allows a tip end thereof to be screwed into the nut N, thereby allowing the bumper beam 3 and the first extending part 4c to be fastened and fixed to each other. Moreover, the bolt B is inserted from above through one bolt hole 3c (collar 3d) and the pair of upper and lower second bolt holes 4g, 4g. The bolt B allows a tip end thereof to be screwed into the nut N, thereby allowing the bumper beam 3 and the second extending part 4d to be fastened and fixed to each other.

The second displacement promoting part 4e is a part capable of promoting displacement (deformation) of the bumper beam 3 by a collision load. The second displacement promoting part 4e is formed by forming the first bolt hole 4f into a long hole extending in the front-rear direction of the vehicle in the present embodiment, but may be a second bolt hole 4g having a long hole shape, or may be a through-hole provided separately from the bolt holes 4f, 4g, a thinly formed part or a cut-out part. The number and location of the second displacement promoting part 4e are not particularly limited, but the second displacement promoting part 4e is provided only at the first bolt hole 4f located innermost in the vehicle width direction among the plurality of bolt holes 4f, 4g formed in the bumper beam mounting member 4 in the present embodiment. The second displacement promoting part 4e has an opening length along the front-rear direction of the vehicle, which is greater than a shaft diameter of the bolt B. With this configuration, when the bumper beam 3 receives a collision load to be displaced (deformed) to the inner side in the front-rear direction of the vehicle (the rear side of the vehicle in the present embodiment), the bolt B is easily moved to the inner side in the front-rear direction of the vehicle in the second displacement promoting part 4e, thus making it possible to promote displacement (deformation) of the bumper beam 3.

The vehicle body structure 1 according to the present embodiment is basically configured as described above, and the operation and effects thereof will be described below.

According to the present embodiment as shown in FIG. 3, the bumper beam 3 has the first displacement promoting part 3b provided at the mounting part for the bumper beam 3 and the bumper beam mounting member 4 and capable of promoting displacement of the bumper beam 3 at the time of collision of the vehicle. Moreover, the bumper beam mounting member 4 includes the second displacement promoting part 4e provided at the mounting part and capable of promoting displacement of the bumper beam 3 at the time of collision of the vehicle. Consequently, the bumper beam 3 on its collision side is easily displaced to the inner side in the front-rear direction of the vehicle (the rear side of the vehicle in the present embodiment) at the time of offset collision, and thus a tensile load applied to the bumper beam 3 on its non-collision side can be suppressed. This makes it possible to suppress separation of the bumper beam 3 from the bumper beam mounting member 4 at the non-collision side.

According to the present embodiment as shown in FIG. 5 and FIG. 6, the first displacement promoting part 3b provided in the bumper beam 3 includes the through-hole vertically penetrating the bumper beam 3, and the opening width of the through-hole expands toward the inner side in the front-rear direction of the vehicle in planar view (toward the rear side of the vehicle in the present embodiment). This allows the bumper beam 3 on its collision side to be more easily displaced to the inner side in the front-rear direction of the vehicle (the rear side of the vehicle in the present embodiment) at the time of offset collision, thus making it possible to further suppress the tensile load applied to the bumper beam 3 on its non-collision side.

According to the present embodiment as shown in FIG. 3, the bead-side mounting part 3a composing the mounting part for the bumper beam 3 and the bumper beam mounting member 4 is provided with the plurality of bolt holes 3c each being a mounting hole. The bolt holes 3c through each of which the bolt B being a mounting member for mounting of the bumper beam 3 and the bumper beam mounting member 4 is inserted are mutually provided at a given interval in the vehicle width direction. Moreover, the first displacement promoting part 3b is provided between adjacent bolt holes 3c, 3c. This makes it possible, even if the first displacement promoting part 3b is provided, to suppress a decrease in strength of the bumper beam 3 on its collision side against a compressive load, thus making it possible suppress displacement of the bumper beam 3 when a collision load applied to the bumper beam 3 is equal to or lower than a predetermined load (e.g., in the case of a light load).

According to the present embodiment as shown in FIG. 3, the bead-side mounting part 3a composing the mounting part for the bumper beam 3 and the bumper beam mounting member 4 is provided with the bolt holes 3c through each of which the bolt B being a mounting member for mounting of the bumper beam 3 and the bumper beam mounting member 4 is inserted. Moreover, the bumper beam mounting member 4 is provided with the first extending part 4c and the second extending part 4d that are provided to extend to the upper and lower faces of the bumper beam 3. Moreover, the second displacement promoting part 4e provided in the bumper beam mounting member 4 has a long hole that is formed in the first extending part 4c and extends in the front-rear direction of the vehicle, and the long hole composes the first bolt hole 4f. Thus, the first bolt hole 4f being a mounting hole is formed into a long hole extending in the front-rear direction of the vehicle, thereby allowing the bumper beam 3 on its collision side to be more easily displaced to the inner side in the front-rear direction of the vehicle (the rear side of the vehicle in the present embodiment) at the time of offset collision, thus making it possible to further suppress the tensile load applied to the bumper beam 3 on its non-collision side.

According to the present embodiment as shown in FIG. 3, the plurality of bolt holes 4f, 4g each being a mounting hole are mutually provided at a given interval in the vehicle width direction, and the long hole composes the first bolt hole 4f located innermost in the vehicle width direction among the plurality of bolt holes 4f, 4g. Thus, the first bolt hole 4f located at the inner side in the vehicle width direction is formed into the long hole extending in the front-rear direction of the vehicle, thereby making it possible to suppress the tensile load applied to the bumper beam 3 on its non-collision side at the time of offset collision, as compared with a case where the second bolt hole 4g located at the outer side in the vehicle width direction is formed into a long hole.

According to the present embodiment as shown in FIG. 4, the bumper beam extension 4a is provided with a plurality of closed sectional parts 44 that are formed side by side in the vehicle width direction, and the closed sectional parts 44 each have a nearly octagonal shape in cross sectional view. This makes it possible to enhance transmission efficiency of a load applied to the bumper beam extension 4a on its collision side to the inner side in the front-rear direction of the vehicle (the rear side of the vehicle in the present embodiment).

According to the present embodiment as shown in FIG. 6, the bumper beam 3 and the bumper beam extension 4a are fastened and fixed to each other with the bolt B to increase a fastening force between them, thus making it possible to further suppress separation of the bumper beam 3 on its non-collision side from the bumper beam mounting member 4.

Although one embodiment of the present invention has been described in detail with reference to the drawings as described above, the present invention is not limited to the embodiment described above, and can be appropriately modified within the scope not departing from the gist of the present invention.

Although, in the present embodiment, description has been given of the case where the present invention is applied to the vehicle body front part (front bumper), the present invention can also be applied to a vehicle body rear part (rear bumper). Where the present invention is applied to the vehicle body rear part, it is preferable that the opening width of the through-hole composing the first displacement promoting part 3b has a triangular shape such that it expands toward the inner side in the front-rear direction of the vehicle in planar view (toward the front side of the vehicle).

Although the displacement promoting part is provided in both of the bumper beam 3 and the bumper beam mounting member 4 in the present embodiment, the displacement promoting part only needs to be provided in at least one of the bumper beam 3 and the bumper beam mounting member 4.

Moreover, although the first extending part 4c is provided to extend to both of the upper and lower faces of the bumper beam 3 in the present embodiment, it only needs to be provided to extend to at least one of the upper and lower faces of the bumper beam 3. Moreover, although the second extending part 4d is provided to extend to both of the upper and lower faces of the bumper beam 3 in the present embodiment, it only need to be provided to extend to at least one of the upper and lower faces of the bumper beam 3.

Although the embodiment of the present invention has been described and illustrated in detail, the disclosed embodiment is made for purposes of illustration and example only and not limitation. The scope of the present invention should be interpreted by terms of the appended claims.

DESCRIPTION OF REFERENCE SIGNS

1: Vehicle body structure Strake; 2: Front side frame (Vehicle body); 3: Bumper beam; 3a: Bead-side mounting part (Mounting part); 3b: First displacement promoting part (Displacement promoting part); 3c: Bolt hole (Mounting hole); 4: Bumper beam mounting member; 4a: Bumper beam extension; 4c: First extending part (Mounting part); 4d: Second extending part (Mounting part); 4e: Second displacement promoting part (Displacement promoting part); 4f: First bolt hole (Mounting hole); 4g: Second bolt hole (Mounting hole); B: Bolt (Mounting member); N: Nut

What is claimed is:
1. A vehicle body structure comprising:
a bumper beam extending in a vehicle width direction; and
a pair of right and left bumper beam mounting members each disposed at an outer side in the vehicle width direction of a back face of the bumper beam and mounting the bumper beam on a vehicle body; wherein
at least one of the bumper beam and the bumper beam mounting members includes a displacement promoting part that is provided at a mounting part for the bumper beam and the bumper beam mounting members and capable of promoting displacement of the bumper beam by a collision load;
the displacement promoting part includes a first displacement promoting part provided in the bumper beam, the first displacement promoting part having a through-hole vertically penetrating the bumper beam;
the mounting part is provided with a plurality of mounting holes through each of which a mounting member for mounting of the bumper beam and the bumper beam mounting member is inserted, and which are mutually provided at a given interval in the vehicle width direction; and
the first displacement promoting part is provided between adjacent mounting holes of the plurality of mounting holes.
2. The vehicle body structure according to claim 1, wherein
the through-hole has an opening width that expands toward an inner side in a front-rear direction of the vehicle in planar view.
3. The vehicle body structure according to claim 2, wherein
the bumper beam mounting member is provided with an extending part that is provided to extend to at least one of upper and lower faces of the bumper beam; and
the displacement promoting part includes a second displacement promoting part provided in the bumper beam mounting member, the second displacement promoting part having a long hole that is formed in the extending part and extends in a front-rear direction of the vehicle, the long hole composing the mounting hole.
4. The vehicle body structure according to claim 3, wherein
the long hole composes one mounting hole among the plurality of mounting holes, which is located at an inner side in the vehicle width direction.
5. The vehicle body structure according to claim 1, wherein the bumper beam mounting member is provided with an extending part that is provided to extend to at least one of upper and lower faces of the bumper beam; and the displacement promoting part includes a second displacement promoting part provided in the bumper beam mounting member, the second displacement promoting part having a long hole that is formed in the extending part and extends in a front-rear direction of the vehicle, the long hole composing the mounting hole.

6. The vehicle body structure according to claim 5, wherein the long hole composes one mounting hole among the plurality of mounting holes, which is located at an inner side in the vehicle width direction.

* * * * *